United States Patent [19]

Schepp et al.

[11] 4,066,585

[45] Jan. 3, 1978

[54] PRINTING INKS AND PRINTING METHODS EMPLOYING THE SAME

[75] Inventors: Horst Schepp, Unna; Manfred Drawert, Froendenberg, both of Germany

[73] Assignee: Schering Aktiengesellschaft, Berlin and Bergkamen, Germany

[21] Appl. No.: 711,147

[22] Filed: Aug. 3, 1976

[30] Foreign Application Priority Data

Aug. 5, 1975 Germany .............................. 2534845

[51] Int. Cl.$^2$ .............................................. C08G 69/26
[52] U.S. Cl. .................................... 260/18 N; 106/27; 106/28; 106/29; 260/24; 260/28 R; 260/37 N; 427/256; 427/288
[58] Field of Search .............. 260/18 N, 28, 24, 37 N; 106/27, 28, 29; 427/256, 288

[56] References Cited

U.S. PATENT DOCUMENTS

| | | | |
|---|---|---|---|
| 3,268,461 | 8/1966 | Jacobson | 260/18 N |
| 3,383,391 | 5/1968 | Carlick et al. | 260/18 N |
| 3,420,789 | 1/1969 | Wilson | 260/18 N |
| 3,461,092 | 8/1969 | Story | 260/18 N |
| 3,522,270 | 7/1970 | Glaser | 260/18 N |
| 3,622,604 | 11/1971 | Drawert et al. | 106/27 |
| 3,639,313 | 2/1972 | Gruben et al. | 260/18 N |
| 3,652,469 | 3/1972 | Glaser et al. | 260/18 N |
| 3,700,618 | 10/1972 | Sharkey et al. | 260/18 N |
| 3,776,867 | 12/1973 | Perry et al. | 260/24 |
| 3,778,394 | 12/1973 | Lovald et al. | 260/24 |
| 3,793,270 | 2/1974 | Goukon et al. | 106/27 |
| 3,872,044 | 3/1975 | Hervey et al. | 260/32.6 NA |
| 3,900,436 | 8/1975 | Drawert et al. | 260/18 N |

*Primary Examiner*—Eugene C. Rzucidlo
*Attorney, Agent, or Firm*—Curtis, Morris & Safford

[57] ABSTRACT

Intaglio and flexographic printing processes employing solvent-free inks, solid at room temperature but molten at printing temperatures, are disclosed, as are inks suitable therefor, said inks comprising a pigment and a thermoplastic binder having a softening point between 90° C. and 160° C., said binder comprising a synthetic polyamide resin or synthetic polyesteramide resin, each resin being the condensation product of (1) an acid component comprising a dimerized fatty acid and a monocarboxylic acid and (2) an amine component comprising a diamine and, in the case of the polyesteramide resin, additionally comprising a diol and/or alkanolamine.

15 Claims, No Drawings

PRINTING INKS AND PRINTING METHODS EMPLOYING THE SAME

The present invention relates to printing inks, to the binders employed therein, and to printing methods employing the inks.

In the development of printing inks, particular printing qualities such as color reproduction, retention of color tone, pigment wetting, and the like have received special attention. The printing inks described above require solvents for their application. The use of solvents is well known to be linked with a variety of disadvantages, both for the manufacturer as well as the processer, for example the danger of explosion, odor, and environmental pollution. Such inks, in addition to the aforementioned disadvantages, also occasion for the user a lessening of the printing quality due to residual solvent, for example a decrease in the blocking point.

Also, determined by the rate of evaporation of the solvent employed, only certain maximum printing speeds can be achieved which, further, cannot be considerably increased by corresponding machine construction.

Particularly, the problems of environmental pollution by solvents and the efforts to avoid this have led in recent times to the development of more and more printing inks which do not require a solvent in the conventional sense.

To these belong, for example, the solventfree printing inks which, for example, comprise a melamine resin, a polyester resin, and a blocked catalyst. Such binder mixtures must, however, be hardened at elevated temperatures [cf. A. Marano, American Ink Maker 11, 30 (1972)].

Other developments proceed from the consideration of using low molecular weight ultraviolet-activatable of ultraviolet-sensitizable monomers as printing inks, which monomers can be brought to reaction on a substrate under the influence of ultraviolet light or electron radiation and harden in a very short time to form a film. Although this process has already been used for a long time in furniture finishing, and although test installations have been introduced for printing processes, nevertheless at the present time the control of the high energy and the influence of certain pigments present problems which have not yet been satisfactorily solved.

The object of the present invention is to find a printing process for intaglio and flexographic printing and a suitable ink therefor which can be employed without solvents whereby, however, good working properties and the high printing quality of conventional printing inks are retained. In particular, this means the creation of special printing inks and binders particularly suitable therefor, which binders exhibit a sufficiently low melt viscosity but nevertheless have good adhesion to the surfaces to be printed.

A feature of the present invention is a method for printing surfaces by intaglio or flexographic printing processes characterized by the use of solvent-free printing inks, solid at room temperature and which comprise a thermoplastic binder, which are stored in a molten condition in the ink receptacles of the printing apparatus and have, at the chosen operating temperatures, a viscosity of not more than 0.5 Pascal-seconds (Pas) (1 Pas = 10 Poises), particularly from 0.05 to < 0.3 Pas. In the inks, the thermoplastic binders are synthetic resins such as polyamides comprising dimerized fatty acids, optional co-dicarboxylic acids, monocarboxylic acids, optional cyclic acid anhydrids, and about equivalent amounts of diamines or diamine mixtures, which resins have softening points between 90° C. and 160° C., preferably between 90° C. and 140° C.

The lower viscosity region can be chosen to correspond with any requirements met in practice. Viscosities of 0.03 Pas have also proved usable at the chosen working temperatures.

A particular advantage of the process of the present invention is that conventional printing machines can be used, which only have been equipped with heatable printing rolls and a heatable ink receptacle. If synthetic resin films are employed as the ink carrier, then it is recommended to cool the platen in order to minimize the influence of temperature on the films.

A further advantage of the method of the invention is that extraordinarily high printing speeds can be attained.

A further feature of the present invention is printing inks for the above-described process, which inks comprise binders, pigments, and optional conventional additives, which inks are characterized by the fact that the binders are thermoplastic synthetic resins having softening points between 90° C. and 160° C., preferably between 90° C. and 140° C., and that the printing inks at working temperatures during printing have viscosities which are not more than about 0.5 Pas, particularly 0.05 to < 0.3 Pas.

A further feature of the invention is a method for printing surfaces, and inks suitable therefor, characterized in that polyamide resins comprising dimerized fatty acids, optional co-dicarboxylic acids, monocarboxylic acids, optional cyclic anhydrides, and about equivalent amounts of diamines or diamine mixtures and diols and/or alkanolamines are used instead of other polyamides.

Particularly advantageous binders for use as meltable printing inks according to the present invention are:

1. polyamide resins prepared from dimerized fatty acids and optional co-dicarboxylic acids and from monocarboxylic acids, and from aliphatic and/or heterocyclic diamines and, optionally, cyclic anhydrides such as, for example, succinic acid anhydride, or phthalic acid anhydride;

2. polyamide resins in which the aliphatic diamines have a chain length of from 2 to 12 carbon atoms and, optionally, also one or more alkyl substituents having up to 4 carbon atoms, optionally together with codiamines such as branched aliphatic and cycloaliphatic diamines and ether diamines;

3. polyamide resins in which the co-dicarboxylic acids are either aliphatic straight chain dicarboxylic acids having a chain length of from 6 to 13 carbon atoms or are aromatic dicarboxylic acids, particularly terephthalic acid or isophthalic acid;

4. polyamide resins in which the monocarboxylic acid is a branched and/or straight chain aliphatic carboxylic acid having a chain length of from 2 to 12 carbon atoms; and/or 5. polyester amide resins comprising the aforementioned dimerized fatty acids, monocarboxylic acids, and aliphatic diamines and monoalkanolamines and/or diols.

The preferred polyamide resins or polyester amide resins have average molecular weights of about 1500 to 3000.

According to the invention, printing inks can also be used in which the binder comprises mixtures of polyamide resins (see 1–5 above) and/or polyester amide resins with still other resins compatible therewith, and which comprise these compatible resins in a ratio of from 1 to 30 percent by weight, preferably from 5 to 15 percent by weight, calculated on the polyamide resin and/or polyester amide resin.

According to the invention, printing inks according to 1–5 above can also be employed wherein, in the polyamide resin and/or polyester amide resin employed as the binder, carboxy stearic acids, carboxymethyl stearic acids, or carboxyethyl stearic acids can be used instead of the dimerized fatty acids, or wherein the latter are replaced by products prepared by the addition of acrylic acid to high molecular weight plurally-unsaturated fatty acids or by the esters thereof.

As resins compatible with polyamide resins and/or polyester amide resins, both synthetic resins and/or natural resins, as well as modified natural resins come into consideration. The materials, for example, include colophonium resins and colophonium resin derivatives, maleinate resins and ketone resins, cumarone and indene resins, phenol resins (novolacs), polyvinyl acetate, and shellac.

For the process of the present invention, all pigments and dyes can be employed which are color-stable under the operating conditions and which are readily dispersible in the aforementioned binders or are soluble therein. Such materials include, for example, Permanent Yellow GGR or Permanent Ruby F6B, Heliogen Blue 7080 or Special Black 4A.

Still other additives can be added to the printing ink batch for improvement of printability, flow behavior, and pigment wetting, for example in amounts from 1–15 percent by weight (preferably 1–10 percent by weight), calculated on the polyamide resin and/or polyester amide resin. Waxes such as ester waxes, amide waxes, hydrocarbon waxes, and/or phenolic or aminic antioxidants can be added in amounts from 0.1–5 percent by weight. The printing inks are preferably used without plasticizers, although the latter can be added to achieve special effects.

As substrates, the printable print carriers conventionally used in flexographic and intaglio printing can be used, such as paper, boxboard, and various synthetic films such as polyolefins or cellophane, as well as metal films such as aluminum film.

For the preparation of the printing inks according to the present invention, one suitably proceeds from pigment pastes, that is pigment-binder concentrates. To prepare these pigment pastes, the binders according to the invention are homogenized with the pigment in a known fashion. Depending on the pigment used, the amount of pigment can be up to 50 percent by weight, and more.

These pigment concentrates are then combined with further binder (either the same or a different binder according to the invention) for reaching the desired pigment-binder concentration and are mixed and homogenized, for example, on a three-roll mill or a similar mixing apparatus, with moderate warming.

In describing the preferred resins, the term "dimerized fatty acid" means polymerized acids which are obtainable from unsaturated natural and synthetic, monobasic, aliphatic fatty acids having from 16–22 carbon atoms, preferably 18 carbon atoms, according to known methods (cf. German Offenlegungsschriften Nos. 1,443,938 and 1,443,968 and German patents 2,118,702 and 1,280,852).

Technical dimerized fatty acids typically obtainable in commerce have the following approximate composition:

| Monomeric acids | 5 – 15 percent by weight |
| Dimeric acids | 60 – 80 percent by weight |
| Trimeric acids | 10 – 35 percent by weight. |

Optionally, those mixtures produced by dimerization which have the following approximate composition:

| Monomeric acids | 30 – 35 percent by weight |
| Dimeric acids | 40 – 60 percent by weight |
| Trimeric acids | 12 – 20 percent by weight | can be employed directly without further preparative procedures. However, the content of dimeric acid can also be raised up to 100 percent by generally known distillation processes. The hydrogenation products of these acids, obtained by known processes (cf. U.S. Pat. No. 3,256,304 and German Offenlegungsschrift No. 1,941,119) are also employable.

As examples of the co-dicarboxylic acids which are optionally employed in the polyamide resins, adipic acid, pimelic acid, suberic acid, azelaic acid, sebacic acid, nonamethylene dicarboxylic acid, decamethylene dicarboxylic acid, and brassylic acid can be mentioned, as well as terephthalic acid and isoterephthalic acid.

As monocarboxylic acids employed for regulation of the molecular weight of the polyamide resins, branched and straight chain, natural and synthetic aliphatic, cycloaliphatic, and aromatic monocarboxylic acids having 2–22 carbon atoms, preferably 2–12 carbon atoms, can be used, alone or in admixture. Preferred chain breakers are, for example, acetic, propionic, pelargonic, cyclohexane carboxylic, cyclohexene-3-carboxylic, and benzoic acids.

If cyclic anhydrides are added for regulation of the molecular weight, either alone or together with monocarboxylic acids, compounds such as maleic acid anhydride, succinic acid anhydride, phthalic acid-, tetrahydrophthalic acid-, and hexahydrophthalic acid-anhydride can be used.

If co-dicarboxylic acids are present in the polyamide resin together with fatty dimerized acids, they may be present in such amounts that the softening point lies between 90° and 160° C.

The equivalence ratio of the combined dimerized fatty acid and optional co-dicarboxylic acid, if present, to the total monocarboxylic acid and/or cyclic acid anhydride is from 0.5:0.5 to 0.3:0.7, particularly at a ratio of 0.4:0.6.

Among the aliphatic diamines, ethylene diamine is particularly employed. As further amine components or co-diamines, the following exemplary materials can be mentioned: propylene diamine, butylene diamine, hexamethylene diamine, 2,4,4(2,2,4)-trimethyl-hexamethylene diamine, nonamethylene diamine, decamethylene diamine, 1,11-diamino undecane, 1,12-diamino dodecane, optionally diethylene triamine, as well as the diamines which can be prepared according to known methods from the carboxystearic acids (Reppe acids).

Examples of cycloaliphatic diamines are: 4,4'-diamino-dicyclohexyl methan; 3,3'-dimethyl-4,4'-diamino-dicyclohexyl methane; 3-aminomethyl-3,5,5-trimethylcyclohexylamine; 1-methyl-4-(1-amino-1-methyl-ethyl)-cyclohexylamine; 9,9-bis-(3-aminopropyl)-fluorene. As suitable cyclic amines, heterocyclic amines also come under consideration. Exemplary heterocyclic diamines are piperazine, dipiperidyl, dipiperidyl propane, and dipiperazyl alkanes.

As exemplary of the ether diamines which are optionally employed as co-diamines according to the invention in small amounts to impart flexibility to the binder resins, if desired, are materials such as those of the general formula $$H_2N-(CH_2)_n-O-(R-O)_x-(CH_2)_n-NH_2,$$

wherein $n$ is an integer from 3 to 5 and wherein $x$ may have the values 0, 1, 2, and 3, and R is an alkylene group having a chain length of from 1 to 12 carbon atoms which optionally may also carry alkyl substituents having from 1 to 4 carbon atoms. Exemplary of such materials are: 1,11-diamino-4,8-dioxa-undecane; 1,11-diamino-4,8-dioxa-5-methyl-undecane; 1,12-diamino-4,9-dioxadodecane; 1,14-diamino-4,7,10-trioxatetradecane; 1,11-diamino-6-oxa-undecane. Further, higher molecular weight diamines, such as can be prepared from the dimeric fatty acids according to known methods, can optionally be coemployed.

As diol or alkanolamine components, used with the diamines, both straight chain and branched alkane diols come into consideration, such as ethane diol, butane diol, hexane diol, 1,12-dodecane diol, and, optionally, the dimeric diols which can be prepared by hydrogenation of the dimeric fatty acids according to known methods, as well as polyether diols such as diethylene glycol and triethylene glycol, ethanolamine, 1,2(1,3)-propanolamine and butanolamine.

The equivalence ratio between the ethylene diamine preferably used according to the invention to the co-diamines or to alkanolamines and diols can be from 1.0:0 to 0.5:0.5, and particularly can be from 0.8:0.2 to 0.9:0.1.

The preparation of the polyamide resin or of the polyester amide resin can be carried out in conventional fashion by reaction of the diamines with the free acids at condensation temperatures between 180°-250° C., particularly at 230° C. The residual water of condensation is preferably removed by the application of a vacuum for 1 to 2 hours. As known in the art, instead of the free acids, their amide-forming derivatives, particularly their esters, can be used, naturally particularly such esters which can easily by subjected to aminolysis, such as the methyl ester and ethyl ester.

A better understanding of the present invention and of its many advantages will be had by referring to the following specific Examples given by way of illustration.

EXAMPLE 1

1.1 Preparation of the Pigment-Binder Concentrate

Binder and pigment, for example Permanent Yellow GGR or Permanent Ruby F6B, or Heliogen Blue 7080, or Special Black 4A, are well mixed in a weight ratio of 1:1 and thereafter homogenized under high pressure in an extruder, kneader, or masticating roller machine at 40° C. to 60° C. The cooled material is subsequently finely ground.

1.2 Preparation of the Printing Ink 12 parts by weight of the above-described pigment concentrate and 88 parts by weight of ground polyamide resin having a softening point of 118° C. and a viscosity of 0.3 Pas at 160° C. are well mixed with 2 parts by weight of montan wax and homogenized on a 2- or 3-roll mill at 60°-70° C. The polyamide resin is prepared from dimeric fatty acid (75 parts by weight of dimeric fatty acid) (0.725 gram equivalents), acetic acid (0.275 gram equivalents), ethylene diamine (0.60 gram equivalents), and propylene diamine (0.40 gram equivalents). The product thus obtained is finely ground after cooling and can subsequently be melted in the ink receptacle of the printing press.

EXAMPLE 2

2.1 Printing Method

Printing is done on a commercial, slightly remodeled, combination intaglio and flexographic press.

2.2 Printing by the Intaglio Process

The finely ground printing ink is placed into the machine's ink trough, which is heated to a temperature of 140° C. to 180° C., preferably to 160° C., by an oil bath, and is melted. The etched intaglio printing roll is heated to about 180° C. As the ink carrier, a pre-treated aluminum film is inserted. After about 10 minutes, printing is begun. In this process, the roll which is conventionally employed as the heating roll is cooled and the blower is changed to air at room temperature. The prints obtained showed very well developed surfaces and outstanding adhesion properties.

2.3 Printing by the Flexographic Process

The finely ground printing ink is put into the machine's ink trough, which is heated to a temperature of 140°-180° C., preferably 160° C., by an oil bath, and is melted.

The flexographic printing roll, which is provided with a stereotype plate resistant to high temperatures (up to about 250° C.), and the transfer roll are heated to about 170° C. Paper, e.g. soda kraft paper, is inserted as the carrier. After 10-15 minutes, the powdered printing ink is melted and printing can be begun. In the method outlined, the roll usually used as the heating roll is cooled and the blower air is adjusted to room temperature. The prints obtained have defect-free surfaces and outstanding adhesion properties.

EXAMPLES 3-19

A number of printing ink binders were prepared having the compositions given below in Table I. The ring and ball softening point, viscosity at 150° C., and adhesion and scratch resistance of the binders after application to both aluminum and polypropylene are also reported in the Table. In all cases, the monocarboxylic acid chainbreaker I (when present) is stearic acid. In all cases, diamine I (when present) is ethylene diamine. The dimerized fatty acid employed in each case had a dimeric fatty acid content of 75% by weight.

TABLE I

| Ex. | Fatty Acid (equiv.) | Monocarboxylic Acid (equiv.) | | Diamine (equiv.) | | Diol or Alkanolamine (equiv.) | Soft. Point (° C.) | Visc. (Pas) | Adhesion* | Scratch Resistance* |
| --- | --- | --- | --- | --- | --- | --- | --- | --- | --- | --- |
|   |   | I | II | I | II |   |   |   |   |   |
| 3 | 0.4 | 0.6 | — | 1.0 | — | — | 128 | 0.073 | sat. | good |

TABLE I-continued

| Ex. | Fatty Acid (equiv.) | Monocarboxylic Acid (equiv.) I | II | Diamine (equiv.) I | II | Diol or Alkanolamine (equiv.) | Soft. Point (° C.) | Visc. (Pas) | Adhesion* | Scratch Resistance* |
|---|---|---|---|---|---|---|---|---|---|---|
| 4 | 0.4 | 0.3 | 0.3 CHA | 1.0 | — | — | 153 | 0.095 | sat. | good |
| 5 | 0.4 | 0.3 | 0.3 Ac | 1.0 | — | — | 149 | 0.083 | good | good |
| 6 | 0.4 | 0.3 | 0.3 IA | 1.0 | — | — | 122 | 0.074 | good | good |
| 7 | 0.4 | 0.6 | — | 0.9 | 0.1 IPD | — | 141 | 0.072 | sat. | sat. |
| 8 | 0.4 | 0.6 | — | 0.9 | 0.1 TMD | — | 137 | 0.078 | sat. | sat. |
| 9 | 0.4 | 0.6 | — | 0.9 | 0.1 BDA | — | 144 | 0.064 | sat. | sat. |
| 10 | 0.4 | 0.6 | — | 0.9 | 0.1 PZ | — | 148 | 0.055 | sat. | sat. |
| 11 | 0.4 | 0.3 | 0.3 PA | 0.9 | 0.1 HDA | — | 138 | 0.074 | v. good | v. good |
| 12 | 0.4 | 0.3 | 0.3 THPA | 0.9 | 0.1 HDA | — | 142 | 0.083 | v. good | good |
| 13 | 0.5 | — | 0.5 BzA | 1.0 | — | — | 129 | 9.074 | v. good | v. good |
| 14 | 0.3 | — | 0.7 CHA | 1.0 | — | — | 137 | 0.079 | v. good | v. good |
| 15 | 0.4 | 0.6 | — | — | 1.0 HDA | — | 133 | 0.067 | sat. | sat. |
| 16 | 0.4 | 0.6 | — | — | 1.0 TMD | — | 68 | 0.075 | good | good |
| 17 | 0.4 | 0.3 | 0.3 BzA | 0.9 | — | 0.1 ELA | 125 | 0.072 | good | v. good |
| 18 | 0.4 | 0.3 | 0.3 BzA | 0.9 | — | 0.1 HDL | 126 | 0.083 | good | v. good |
| 19 | 0.4 | 0.6 | — | 0.9 | — | 0.1 BDL | 142 | 0.066 | sat. | sat. |

KEY TO TABLE I
IPD = Isophorondiamine
TMD = Isomeric mixture of 2,4,4-trimethyl-hexamethylenediamine and 2,2,4-trimethylhexamethylenediamine
BDA = 1,12-diamino-4,9-dioxa-dodecane
HDA = Hexamethylenediamine
HDL = 1,6-hexanediol
BDL = 1,3-butanediol
ELA = ethanolamine
CHA = cyclohexene-3-carboxylic acid
Ac = acetic acid
IA = isononane acid
PA = pelargonic acid
THPA = tetrahydrophthalic acid anhydride
BzA = benzoic acid
PZ = piperazine
sat. = satisfactory
*on aluminum or polypropylene foil

EXAMPLES 20–25

Further binders were prepared by combining the polyamide or polyesteramide resins of certain of the earlier Examples with additive resins, as in Table II below. Again, the ring and ball softening points, viscosity, and adhesion and scratch resistance on aluminum and polypropylene substrates are reported.

TABLE II

| Ex. | Resin of Example No. | Resin Additive | Softening Point (° C.) | Viscosity (Pas) | Adhesion | Scratch Resistance |
|---|---|---|---|---|---|---|
| 20 | 5 | Ketone Resin 7% ("Ketone Resin A") | 158 | 0.075 | good | good |
| 21 | 18 | Phenolic Resin 15% ("Albertol KP 692") | 127 | 0.107 | good | v. good |
| 22 | 18 | Phenolic Resin 30% ("Albertol KP 692") | 97 | 0.226 | good | v. good |
| 23 | 11 | Colophonium Resin 8% ("Rokramar 1051") | 137 | 0.053 | good | good |
| 24 | 11 | Colophonium Resin 15% ("Rokramar 1051") | 142 | 0.061 | v. good | v. good |
| 25 | 4 | Cumerone-Indene Resin 7% ("PH 3") | 159 | 0.052 | sat. | sat. |

While there are similarities between the printing inks described and claimed in the present application to inks taught in U.S. Pat. No. 3,872,044 to be useful in a screen printing process, the prior art inks are not suitable for intaglio and flexographic printing.

What is claimed is:

1. In a process for printing surfaces by an intaglio or flexographic printing process, the improvement wherein a solvent-free printing ink, solid at room temperature but molten at printing temperatures, is employed, said ink having a viscosity of not more than 0.5 Pas at printing temperatures and comprising a pigment and a thermoplastic binder having a softening point between 90° C. and 160° C., said binder comprising a synthetic resin having an average molecular weight between about 1500 and 3000 and being selected from the group consisting of polyamide resins and polyesteramide resins, said polyamide resins being the condensation product of approximately equivalent amounts of (1) an acid component comprising a dimerized fatty acid and a monocarboxylic acid and (2) an amine component comprising a diamine, and said polyesteramide resins being the condensation product of approximately equivalent amounts of (1) an acid component comprising a dimerized fatty acid and a monocarboxylic acid and (2) an amine component comprising a diamine and at least one member selected from the group consisting of diols and alkanolamines, said acid component (1) of said polyamide and polyesteramide resins optionally comprising co-dicarboxylic acids and cyclic acid anhydrides, the equivalence ratio of the combined dimerized fatty acid and optional co-dicarboxylic acid to the total monocarboxylic acid and optional cyclic acid anhydride being from 0.5:0.5 to 0.3:0.7.

2. A solvent-free printing ink, solid at room temperature but molten at printing temperatures, said ink having a viscosity of not more than 0.5 Pas at printing temperatures and comprising a pigment and a thermoplastic binder having a softening point between 90° C. and 160° C., said binder comprising a synthetic resin having an average molecular weight between about 1500 and 3000 and being selected from the group consisting of polyamide resins and polyesteramide resins, said polyamide resins being the condensation product of approximately equivalent amounts of (1) an acid component comprising a dimerized fatty acid and a monocarboxylic acid and (2) an amine component comprising a diamine, and said polyesteramide resins being the condensation product of approximately equivalent amounts of (1) an acid component comprising a dimerized fatty acid and a monocarboxylic acid and (2) an amine component comprising a diamine and at least one member selected from the group consisting of diols and alkanolamines, said acid component (1) of said polyamide and polyesteramide resins optionally comprising codicarboxylic acids and cyclic acid anhydrides, the equivalence ratio of the combined dimerized fatty acid and optional co-dicarboxylic acid to the total monocarboxylic acid and optional cyclic acid anhydride being from 0.5:0.5 to 0.3:0.7.

3. A printing ink as in claim 2 wherein said thermoplastic binder additionally comprises from 1 to 30 parts, by weight of said synthetic resin, of a further resin compatible therewith.

4. A printing ink as in claim 3 wherein said further resin is present in an amount from 5 to 15 parts by weight of said synthetic resin.

5. A printing ink as in claim 2 wherein said thermoplastic binder additionally comprises from 1 to 10 parts, by weight of said synthetic resin, of a wax.

6. A printing ink as in claim 5 wherein said wax is present in an amount from 1 to 5 parts by weight of said synthetic resin.

7. A printing ink as in claim 2 wherein said synthetic resin is a polyamide resin.

8. A printing ink as in claim 7 wherein the acid component (1) of said polyamide resin additionally comprises at least one member selected from the group consisting of co-dicarboxylic acids and cyclic acid anhydrides.

9. A printing ink as in claim 2 wherein said synthetic resin is a polyesteramide resin.

10. A printing ink as in claim 9 wherein the acid component (1) of said polyesteramide resin additionally comprises at least one member selected from the group consisting of co-dicarboxylic acids and cyclic acid anhydrides.

11. A thermoplastic binder adaptable to use in printing inks, said binder having a softening point between 90° C. and 160° C. and comprising a synthetic resin having an average molecular weight between about 1500 and 3000 and being selected from the group consisting of polyamide resins and polyesteramide resins, said polyamide resins being the condensation product of approximately equivalent amounts of (1) an acid component comprising a dimerized fatty acid and a monocarboxylic acid and (2) an amine component comprising a diamine, and said polyesteramide resins being the condensation product of approximately equivalent amounts of (1) an acid component comprising a dimerized fatty acid and a monocarboxylic acid and (2) an amine component comprising a diamine and at least one member selected from the group consisting of diols and alkanolamines, said acid component (1) of said polyamide and polyesteramide resins optionally comprising codicarboxylic acids and cyclic acid anhydrides, the equivalence ratio of the combined dimerized fatty acid and optional co-dicarboxylic acid to the total monocarboxylic acid and optional cyclic acid anhydride being from 0.5:0.5 to 0.3:0.7.

12. A thermoplastic binder as in claim 11 wherein the acid component (1) of said polyamide resin or polyesteramide resin additionally comprises at least one member selected from the group consisting of aromatic dicarboxylic acids and aliphatic straight-chain dicarboxylic acids having from 6 to 13 carbon atoms.

13. A thermoplastic binder as in claim 11 wherein said aromatic dicarboxylic acids are terephthalic acid or isophthalic acid.

14. A thermoplastic binder as in claim 11 wherein the amine component (2) of said polyamide resin or polyesteramide comprises an aliphatic diamine having from 2 to 12 carbon atoms or such a diamine additionally having at least one alkyl substituent having up to four carbon atoms.

15. A thermoplastic binder as in claim 11 wherein the monocarboxylic acid present in the acid component (1) of said polyamide resin or polyesteramide resin is a straight-chain or branched natural or synthetic, aliphatic, cycloaliphatic, or aromatic monocarboxylic acid having from 2 to 22 carbon atoms.

* * * * *